G. W. Hatch,
Fence Post.

No. 64,417.     Patented May 7. 1867.

Witnesses
W. H. Burridge
Frank Alden

Inventor
G. W. Hatch

United States Patent Office.

G. W. HATCH, OF GARRETTSVILLE, OHIO.

Letters Patent No. 64,417, dated May 7, 1867.

FENCE POST PEDESTAL.

*The Schedule referred to in these Letters Patent and making part of the same.*

TO ALL WHOM IT MAY CONCERN:

Be it known that I, G. W. HATCH, of Garrettsville, in the county of Portage, and State of Ohio, have invented certain new and useful inventions in Fence Post Pedestals; and I do hereby declare that the following is a full and complete description of the same, reference being had to the accompanying drawings, making part of this specification, in which—

Like letters of reference refer to like parts in the different views presented.

Figure 2:
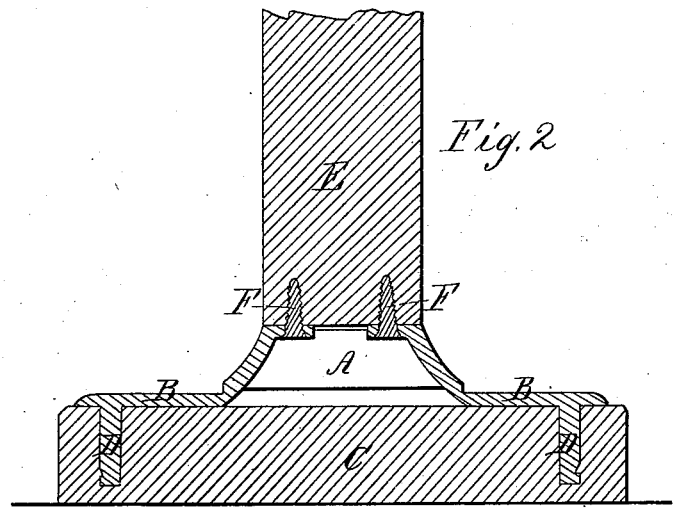
Figure 2 is a vertical section.
Figure 1:
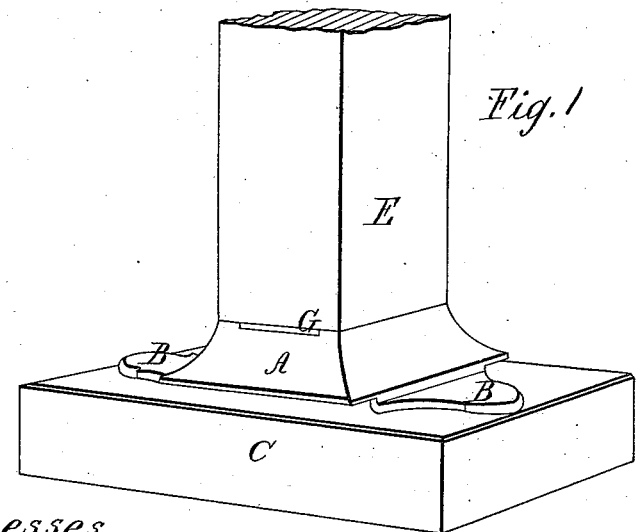
Figure 1 is a perspective view of the post and pedestal.

This pedestal consists of a hollow metallic shell, A, the size of which being according to the size of the post to be supported thereon. Projecting from two opposite sides of the shell are lugs B, upon which it stands, and is thereby raised a little above the stone C, on which the structure of the fence is placed, as shown in fig. 2, and is prevented from being displaced by dowel-pins D, which are let into the stone or block C referred to. Upon the top of this shell is set the post E, and is secured to the same by the screws F, or by any other suitable means.

It is evident that by the use of a pedestal thus constructed the post is thereby raised above the ground, free from the moisture and damp which cause a post, when set in the ground in the ordinary manner, to decay rapidly. The post, by being set on this pedestal, is not only raised above the ground away from the dampness, but is also freely ventilated by the air being allowed to pass under the edge of the shell and through the openings G, which like openings may be on all sides, thus allowing a circulation of air under the end of the post, thereby keeping it dry and from quick decay. The broad-spreading lugs serve as a brace in supporting the post, and which are positioned transversely to the line of the fence, it being braced lengthwise by the several panels constituting the length of fencing.

What I claim as my invention, and desire to secure by Letters Patent, is—

The construction of a metallic pedestal, A, provided with ventilating openings G, in combination with the post E, for the purpose and in the manner substantially as described.

G. W. HATCH.

Witnesses:
W. H. BURRIDGE,
E. E. WAITE.